(12) United States Patent
Styszynski et al.

(10) Patent No.: US 12,289,234 B1
(45) Date of Patent: Apr. 29, 2025

(54) LOGICAL FABRIC OVERLAYS

(71) Applicant: Juniper Networks, Inc., Sunnyvale, CA (US)

(72) Inventors: Michal Styszynski, Antony (FR); Subramaniam Vinod, San Jose, CA (US); Mahesh Kumar Subramaniam, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 5 days.

(21) Appl. No.: 18/491,543

(22) Filed: Oct. 20, 2023

(51) Int. Cl.
*G06F 15/16* (2006.01)
*H04L 45/00* (2022.01)
*H04L 45/42* (2022.01)
*H04L 45/50* (2022.01)

(52) U.S. Cl.
CPC ............ *H04L 45/566* (2013.01); *H04L 45/42* (2013.01); *H04L 45/50* (2013.01)

(58) Field of Classification Search
CPC ........ H04L 45/42; H04L 45/50; H04L 45/566
USPC ....................................................... 709/238
See application file for complete search history.

(56) References Cited

U.S. PATENT DOCUMENTS

| | | | | |
|---|---|---|---|---|
| 8,959,215 B2* | 2/2015 | Koponen | .......... | G06F 15/17312 709/225 |
| 8,966,035 B2* | 2/2015 | Casado | ............... | H04L 41/0896 718/1 |
| 9,455,901 B2* | 9/2016 | Davie | ..................... | H04L 63/00 |
| 9,590,919 B2* | 3/2017 | Casado | ................... | H04L 45/66 |
| 10,135,726 B2* | 11/2018 | Jiang | ........................ | H04L 49/70 |
| 10,187,302 B2* | 1/2019 | Chu | ....................... | H04L 45/245 |
| 10,320,585 B2* | 6/2019 | Koponen | .............. | H04L 49/254 |
| 11,102,186 B2* | 8/2021 | Wang | ...................... | H04L 41/20 |
| 11,190,461 B2 | 11/2021 | Singh et al. | | |
| 11,303,619 B2* | 4/2022 | Wang | .................. | G06F 9/45558 |
| 11,425,022 B1 | 8/2022 | Singh et al. | | |
| 12,101,252 B2* | 9/2024 | Stan | ........................ | H04L 45/42 |
| 2004/0062244 A1* | 4/2004 | Gil | ............................ | H04L 9/40 370/428 |
| 2006/0059269 A1* | 3/2006 | Chen | ..................... | H04L 49/557 709/226 |
| 2010/0257263 A1* | 10/2010 | Casado | ................. | H04L 41/122 718/1 |
| 2013/0044748 A1* | 2/2013 | Shah | ..................... | H04L 12/413 370/355 |

(Continued)

FOREIGN PATENT DOCUMENTS

WO 2013184846 A1 12/2013

*Primary Examiner* — Moustafa M Meky
(74) *Attorney, Agent, or Firm* — Shumaker & Sieffert, P.A.

(57) ABSTRACT

Techniques are disclosed for overlaying logical switch fabrics upon a physical switch fabric comprising multiple physical switch devices. In one example, a network device determines an overlay network associated with a received packet. The network device determines a logical identifier that is associated with the overlay network. In some examples, the logical identifier corresponds to a color. The network device selects a logical switch fabric that is associated with the logical identifier from a plurality of other logical switch fabrics that are overlaid upon a physical switch fabric comprising a plurality of network switch devices. The network device forwards the received packet to the selected logical switch fabric for transport across the physical switch fabric.

20 Claims, 9 Drawing Sheets

(56) References Cited

U.S. PATENT DOCUMENTS

| | | | |
|---|---|---|---|
| 2015/0180801 A1* | 6/2015 | Casado | H04L 49/25 370/409 |
| 2018/0097777 A1* | 4/2018 | Li | H04L 63/104 |
| 2018/0123954 A1* | 5/2018 | Jiang | H04L 49/70 |
| 2022/0393974 A1* | 12/2022 | Wen | H04L 45/742 |
| 2023/0388320 A1* | 11/2023 | Lu | H04L 63/1416 |

* cited by examiner

LOGICAL FABRIC OVERLAYS

TECHNICAL FIELD

This disclosure generally relates to computer networks, and more specifically, to switch fabrics for computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for configuring logical switch fabrics in a physical switch fabric comprising multiple physical switch devices and assigning one of the logical switch fabrics to forward overlay network traffic of a server overlay for one or more servers connected by the physical switch fabric. In one example, a network device determines an overlay network associated with a received packet. The network device determines a logical identifier (also referred to herein as a "logical fabric identifier") that is associated with the overlay network. In some examples, the logical identifier corresponds to a color. The network device selects a logical switch fabric that is associated with the logical identifier from a plurality of other logical switch fabrics that are overlaid upon a physical switch fabric comprising a plurality of network switch devices. The network device forwards the received packet using the selected logical switch fabric for transport across the physical switch fabric.

The techniques of the disclosure may provide specific improvements to the computer-related field of computer networking that have practical applications. For example, the techniques of the disclosure may enable the logical isolation of network traffic of different tenants of a data center while such network traffic is forwarded along a switch fabric. In addition, the techniques of the disclosure may enable a physical switch fabric to provide enhanced management of network traffic forwarded across the switch fabric, such as by improving traffic engineering, load balancing, Service-level Agreement (SLA) compliance, failover techniques, and resource management. In addition, the techniques of the disclosure may enable, via respective logical switch fabrics, a switch fabric that is tailored to the needs of each specific tenant, while requiring only the physical infrastructure of a single physical switch fabric, thereby providing enhanced customization to each tenant while reducing administrative overhead and maintenance of the switch fabric.

In one example, this disclosure describes a network device comprising: storage media; and processing circuitry in communication with the storage media, the processing circuitry configured to: determine an overlay network of a plurality of overlay networks associated with a received packet; determine a logical identifier (ID) of a plurality of logical IDs that is associated with the overlay network; select a logical switch fabric from a plurality of logical switch fabrics that is associated with the logical ID, the plurality of logical switch fabrics overlaid upon a physical switch fabric comprising a plurality of network switch devices; and forward the received packet to the selected logical switch fabric for transport across the physical switch fabric.

In another example, this disclosure describes a method comprising: determining, by a network device, an overlay network of a plurality of overlay networks associated with a received packet; determining, by the network device, a logical identifier (ID) of a plurality of logical IDs that is associated with the overlay network; selecting, by the network device, a logical switch fabric from a plurality of logical switch fabrics that is associated with the logical ID, the plurality of logical switch fabrics overlaid upon a physical switch fabric comprising a plurality of network switch devices; and forwarding, by the network device, the received packet to the selected logical switch fabric for transport across the physical switch fabric.

In another example, this disclosure describes non-transitory, computer-readable media comprising instructions that, when executed, are configured to cause processing circuitry of a network device to: determine an overlay network of a plurality of overlay networks associated with a received packet; determine a logical identifier (ID) of a plurality of logical IDs that is associated with the overlay network; select a logical switch fabric from a plurality of logical switch fabrics that is associated with the logical ID, the plurality of logical switch fabrics overlaid upon a physical switch fabric comprising a plurality of network switch devices; and forward the received packet to the selected logical switch fabric for transport across the physical switch fabric.

The details of one or more examples of the techniques of this disclosure are set forth in the accompanying drawings and the description below. Other features, objects, and advantages of the techniques will be apparent from the description and drawings.

BRIEF DESCRIPTION OF DRAWINGS

Like reference characters refer to like elements throughout the figures and description.

DETAILED DESCRIPTION

A conventional Internet Protocol (IP) fabrics do not have any form of correlation between a locally-defined infrastructure overlay (for example, Media Access Control Virtual Routing and Forwarding (MAC-VRF) or Type-5 Ethernet Virtual Private Network-Virtual extensible Local Area Network (EVPN-VXLAN)) and a physical switch fabric forwarding infrastructure, which may use IP-Equal Cost Multipath (ECMP) within the fabric.

In addition, a conventional IP fabric does not have any forwarding correlation between the server and leaf-switch. For example, a conventional IP fabric has no correlation or intelligence between the server overlay configuration and the Top-of-Rack (TOR) overlay configuration. Allocating specific fabric leaf-spine-super spine resources for a specific set of services or isolating a range of services from another range of services is not possible with such a conventional IP Fabric and EVPN-VXLAN fabric. For example, server overlays use only the IP ECMP that is available inside the fabric. In some situations, this may lead to resource overutilization and inefficient forwarding for time-sensitive applications. This may cause additional reordering operations at the egress side of the fabric. For applications such as Artificial Intelligence (AI)/Machine learning (ML), this may result in competition with other applications on the same fabric and the same switch for the fabric resources. This may cause the switch to be inefficient, leading to performance issues and a poor user experience.

In accordance with the techniques of the disclosure, a network system as described herein may correlate IP fabric underlay forwarding with server overlay networks by sensing the server overlay at the switch level (L1/L2/L3), allocate the server overlay to a specific fabric identifier (also referred to as a "logical identifier" herein) that identifies a logical switch fabric, and forward traffic associated with the server overlay in a more deterministic manner to spine nodes associated with the same fabric identifier.

Therefore, a network system as described herein may perform sensing of the server overlays and applications from network traffic received from servers of a data center and dynamically allocate the server overlays to different logical switch fabrics to load balance network traffic in a controlled and predictable manner. In some examples, a switch device may use a static definition of an application mapping to a particular logical identifier. In some examples, a switch device may use a new Border Gateway Protocol (BGP) Address Family Indicator (AFI)/Subsequent Address Family Indicator (SAFI) to signalize a range of services VRFs linked to specific logical identifier. Furthermore, a switch device as described herein may provide a logical fabric fallback function wherein a logical fabric has a backup or fallback fabric that is advertised as part of a logical fabric advertisement using the BGP AFI/SAFI described herein.

Figure 1:
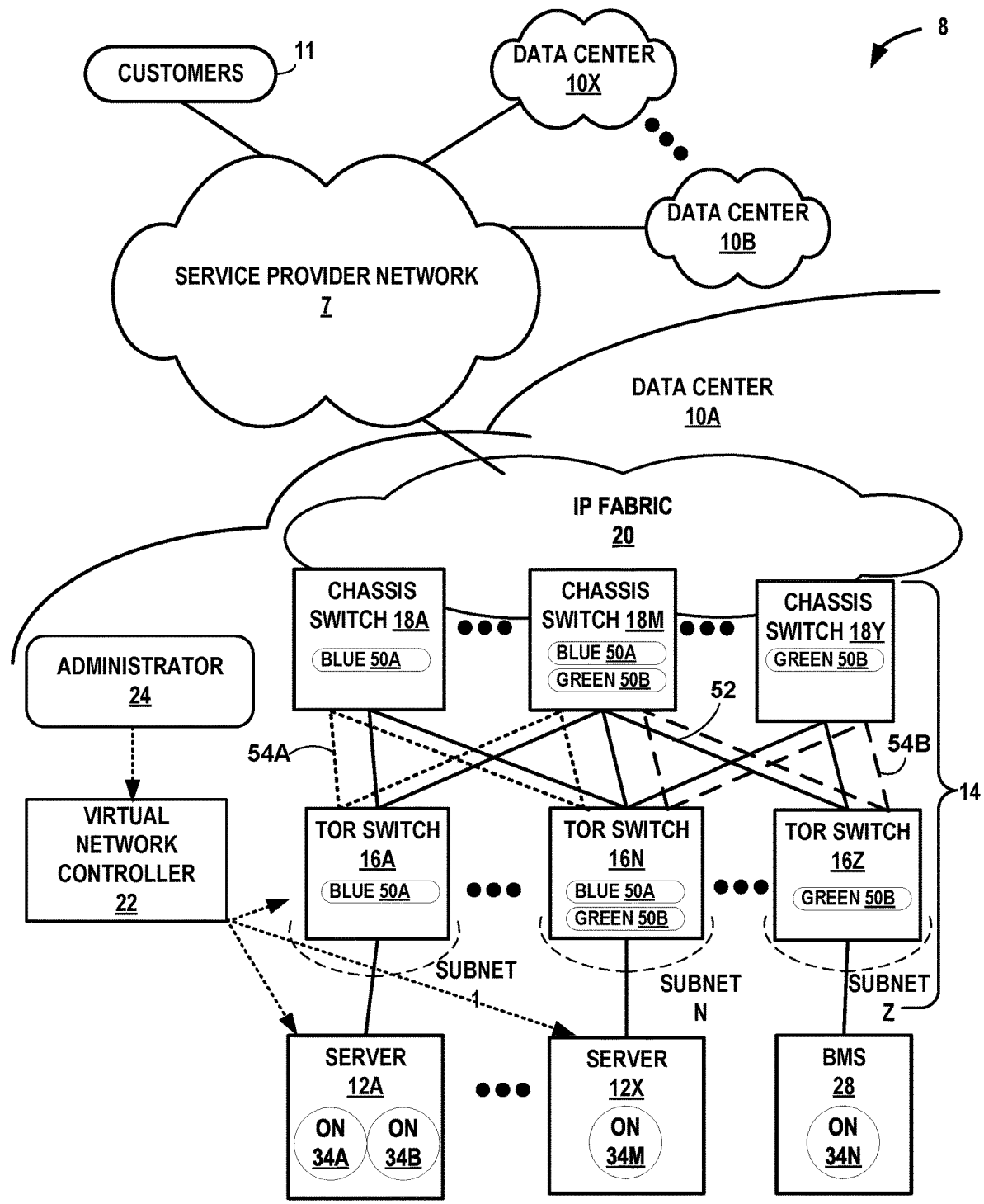
FIG. 1 is a block diagram illustrating an example network system, in which examples of the techniques described herein may be implemented.

FIG. 1 is a block diagram illustrating an example network system in which examples of the techniques described herein may be implemented. Network system 8 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may represent a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or supercomputing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected TOR switches 16A-16Z (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Virtual network controller 22 ("VNC") provides a logically and in some cases physically centralized controller for facilitating operation of one or more virtual networks within each of data centers 10, such as data center 10A, in accordance with one or more embodiments of this disclosure. In some examples, virtual network controller 22 may operate in response to configuration input received from network administrator 24. Additional information regarding virtual network controller 22 operating in conjunction with other devices of data center 10A or other software-defined network is found in International Application Number PCT/US2013/044378, filed Jun. 5, 2013, and entitled "PHYSICAL PATH DETERMINATION FOR VIRTUAL NETWORK PACKET FLOWS," which is incorporated by reference as if fully set forth herein.

In some examples, the traffic between any two network devices, such as between network devices within IP fabric 20 (not shown), between servers 12 and customers 11, or between servers 12, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

As further shown in the example of FIG. 1, switch fabric 14 may include additional TOR switches 16O-16Z that interface with so-called bare metal servers ("BMS") 28. BMS 28 may represent a server dedicated for use by a single customer, which may also be called a "single-tenant server." Unlike servers 12 in which multiple customers (or, again, in other words, "tenants") may interact with the same physical hardware, i.e., server 12, to interface with their individually allocated virtual router, BMS 28 is dedicated for use only by a single customer.

BMS 28 may provide dedicated hardware for use by the single customer to avoid so-called "noisy neighbor problems" that occur in multi-tenant servers 12. That is, while each customer may receive a dedicated virtual router that generally is not impacted by operation of any other dedicated virtual routers by one of multi-tenant servers 12, in certain contexts, the other virtual routers may consume resources (e.g., processor cycles, memory, bandwidth, etc.) that would have otherwise been available for another customer's virtual routers, thereby degrading the performance of the remaining virtual routers (much as a noisy neighbor may create problems for other residents, hence the name "noisy neighbor problems"). As such, BMS 28 may provide a dedicate hardware environment that avoids such noisy neighbor problems, and thereby potentially ensures that the customer processing demands are more likely to be met. One premise driving the use of BMS 28 therefore lies in exclusivity, and as a result, some data center operators may not allow BMS 28 to execute the above noted VN agents responsible for enforcing the policies within BMS 28.

In accordance with the techniques described in this disclosure, TOR switches 16 and chassis switches 18 of physical switch fabric 14 implement a plurality of logical switch fabrics 54A and 54B (collectively, "logical switch fabrics 54"). In the example of FIG. 1, physical switch fabric 14 comprises a plurality of hardware-based TOR switches 16 and hardware-based chassis switches 18 interconnected via physical links 52. In some examples, a multi-line card chassis switching system comprises a plurality of line cards that provides the functionality of one or more TOR switches 16 or chassis switches 18. TOR switches 16 and chassis switches 18 overlay logical switch fabrics 54 upon physical switch fabric 14. With respect to the example of FIG. 1, a first logical switch fabric 54A is associated with the logical identifier "blue," while a second logical switch fabric 54B is associated with the logical identifier "green." Other switching architectures and arrangements may be used.

Each of TOR switches 16 and chassis switches 18 may be configured with (or otherwise associated with) one or more logical identifiers so as to be assigned to a corresponding logical switch fabric 54. In the example of FIG. 1, TOR switch 16A and chassis switch 18A are configured with the "blue" logical identifier 50A. TOR switch 16N and chassis switch 18M are configured with both the "blue" logical identifier 50A and the "green" logical identifier 50B. TOR switch 16Z and chassis switch 18Y are configured with the "green" logical identifier 50B. Therefore, logical switch fabric 54A includes TOR switches 16A, 16N and chassis switches 18A, 18M. Furthermore, logical switch fabric 54B includes TOR switches 16N, 16Z and chassis switches 18M, 18Y.

As described herein, each server overlay network 34A-34N (collectively, "server overlay networks 34," "overlays 34," or "overlay networks 34") provided by servers 12 may also be configured with a logical identifier. In the example of FIG. 1, one or more overlays 34 of server 12A are associated with the "blue" logical identifier 50A, while one or more overlays 34 of server 12X and BMS 28 are associated with the "green" logical identifier 50B. As described in more detail below, each TOR switch 16 may maintain a mapping or association between each overlay 34 of servers 12 and a corresponding logical identifier 50.

A network device, such as TOR switch 16N, receives network traffic from, e.g., server 12X comprising one or more packets. TOR switch 16N determines a server overlay 34 associated with the received one or more packets. TOR switch 16N determines a logical identifier that is associated with the server overlay 34. In some examples, the logical identifier corresponds to a color, textual descriptor, name, number, or other type of distinguishable information. For example, with respect to FIG. 1, TOR switch 16N determines that the server overlay 34 associated with the network traffic received from server 12X is associated with the "green" logical identifier. TOR switch 16N selects logical switch fabric 54B that is associated with the "green" logical identifier from a plurality of other logical switch fabrics 54 that are overlaid upon physical switch fabric 14. In some examples, after selecting logical switch fabric 54B, TOR switch 16N selects a next-hop network device to which to forward the received traffic, such as chassis switch 18M or 18Y, belonging to the logical switch fabric 54B. In this example, TOR switch 16N selects chassis switch 18M and forwards the received network traffic to chassis switch 18M for transport across physical switch fabric 14.

Figure 2:
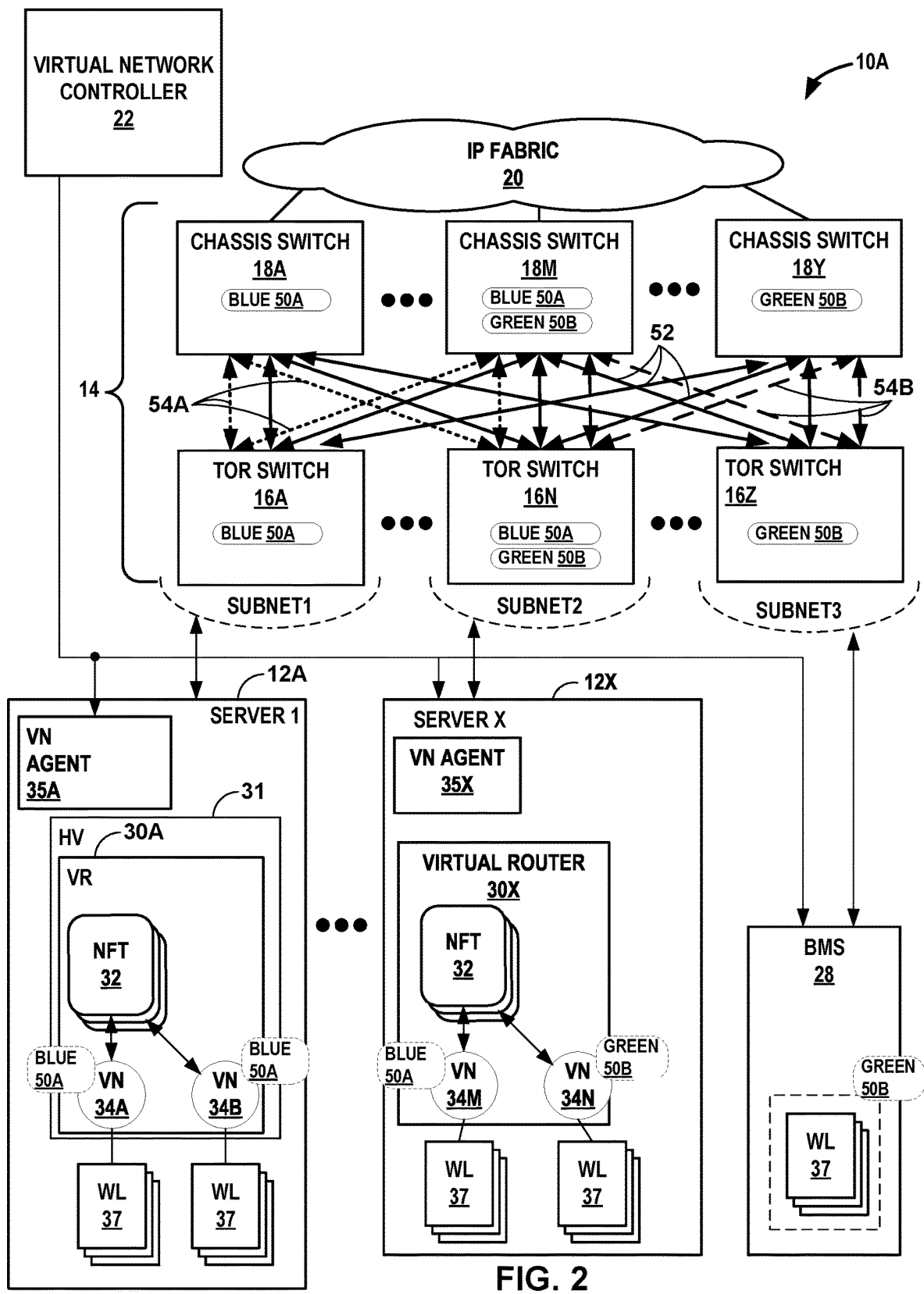
FIG. 2 is a block diagram illustrating an example implementation of a portion of the network system of FIG. 1 in further detail.

FIG. 2 is a block diagram illustrating an example implementation of a portion of network system 8 of FIG. 1 in further detail. In the example of FIG. 2, data center 10A includes an overlay network that extends switch fabric 14 from physical switches 16, 18 to software or "virtual" switches 30A-30X (collectively, "virtual routers 30" or "VR 30"). Virtual routers 30 dynamically create and manage one or more virtual networks 34A-34N (collectively, "virtual networks 34") (usable for communication between application instances. In one example, virtual routers 30 execute virtual networks 34 as an overlay network, which provides the capability to decouple an application's virtual address from a physical address (e.g., IP address) of the one of servers 12A-12X ("servers 12") on which the application is executing. Virtual networks 34 may also be referred to herein as "server overlay networks 34" or "overlay networks 34". Virtual networks 34 of FIG. 2 may be examples of overlay networks 34 of FIG. 1. Each virtual network 34 may use its own addressing and security scheme and may be viewed as orthogonal from the physical network and its addressing scheme. Various processes may be used to transport packets within and across virtual networks 34 over the physical network. In some examples, virtual networks 34 may provide multicast service without requiring multicast support in the underlying physical network. As described in more detail below, each virtual network 34 is configured with a logical identifier 50.

As depicted in the example of FIG. 2, virtual networks 34A, 34B, and 34M are configured with logical identifier 50A ("blue") and virtual network 34N is configured with logical identifier 50B ("green"). In the example of FIG. 2, the logical identifiers 50 assigned to virtual networks 34 are annotated with dashed lines to represent that, while virtual networks 34 may be assigned to such logical identifiers 50, such assignment may be transparent to virtual networks 34 and/or servers 12. Rather, as described in more detail below, each TOR switch 16 may maintain a mapping or association between each virtual network 34 and a corresponding logical identifier 50.

Each virtual router 30 may execute within a hypervisor, a host operating system or other component of each of servers 12. Each of servers 12 may represent an x86 or other general-purpose server, or a special-purpose server, capable of executing workloads (WL) 37. In the example of FIG. 2, virtual router 30A executes within hypervisor 31, also often referred to as a virtual machine manager (VMM) and may be denoted as "HV" in the example of FIG. 2, which provides a virtualization platform that allows multiple operating systems to concurrently execute within one of servers 12. In the example of FIG. 2, virtual router 30A manages virtual networks (VN) 34, each of which provides a network environment for execution of one or more virtual machines (VMs) (that may execute one or more of WLs 37) within the virtualization platform provided by hypervisor 31. Each VM is associated with one of the virtual networks and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of the VMs may represent containers, another form of virtualized execution environment. That is, both virtual machines and container are examples of virtualized execution environments for executing workloads.

In general, each WL 37 may be any type of software application and may be assigned a virtual address for use within a corresponding virtual network 34, where each of the virtual networks may be a different virtual subnet provided by virtual router 30A. A WL 37 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between WLs 37 and virtual network controller 22. For example, a WL 37 may request to send a message using its virtual address via the VN agent 35A, and VN agent 35A may in turn send the message and request that a response to the message be received for the virtual address of one of WLs 27 that originated the first message. In some cases, a WL 37 may invoke a procedure or function call presented by an application programming interface of VN agent 35A, and the VN agent 35A may handle encapsulation of the message, including addressing. Each VN agent 35 may also apply one or more policies to one or more categories, as described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Switches 16, 18 and virtual routers 30 may also maintain routing information, such as one or more routing and/or forwarding tables. In one example, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques described in this disclosure, TOR switches 16 and chassis switches 18 of physical switch fabric 14 implement a plurality of logical switch fabrics 54. In the example of FIG. 2, physical switch fabric 14 comprises a plurality of hardware-based TOR switches 16 and hardware-based chassis switches 18 interconnected via physical links 52. In some examples, a multi-line card chassis switching system comprises a plurality of line cards that provides the functionality of one or more TOR switches 16 or chassis switches 18. TOR switches 16 and chassis switches 18 overlay logical switch fabrics 54 upon physical switch fabric 14. With respect to the example of FIG. 1, a first logical switch fabric 54A is associated with the logical identifier "blue," while a second logical switch fabric 54B is associated with the logical identifier "green."

Each of TOR switches 16 and chassis switches 18 may be configured with one or more logical identifiers so as to be assigned to a corresponding logical switch fabric 54. In the example of FIG. 2, TOR switch 16A and chassis switch 18A are configured with the "blue" logical identifier 50A. TOR switch 16N and chassis switch 18M are configured with both the "blue" logical identifier 50A and the "green" logical identifier 50B. TOR switch 16Z and chassis switch 18Y are configured with the "green" logical identifier 50B. Therefore, logical switch fabric 54A includes TOR switches 16A, 16N and chassis switches 18A, 18M. Furthermore, logical switch fabric 54B includes TOR switches 16N, 16Z and chassis switches 18M, 18Y.

In some examples, a single network switch device, such as one of TOR switches 16 and chassis switches 18, may be assigned to multiple logical switch fabrics 54, and may receive and forward network traffic for any logical switch fabric for which the network switch device is assigned. For example, TOR switch 16N may implement at least a portion of logical switch fabric 54A and at least a portion of logical switch fabric 54B.

In other examples, each network switch device, such as one of TOR switches 16 and chassis switches 18, may be assigned to only a single logical switch fabric 54, and may receive and forward network traffic for only the logical switch fabric for which the network switch device is assigned. For example, For example, TOR switch 16A may implement at least a portion of logical switch fabric 54A, while TOR switch 16A may implement at least a portion of logical switch fabric 54B.

With respect to the example of FIG. 2, TOR switch 16N receives network traffic from server 12X comprising one or more packets. TOR switch 16N determines that the received one or more packets are associated with virtual network 34N. TOR switch 16N determines a logical identifier 50 that is associated with virtual network 34N (e.g., "green" logical identifier 50B). TOR switch 16N selects logical switch fabric 54B that is associated with the "green" logical identifier from a plurality of other logical switch fabrics 54 that are overlaid upon physical switch fabric 14. In some examples, after selecting logical switch fabric 54B, TOR switch 16N selects a next-hop network device to which to forward the received traffic, such as chassis switch 18M or 18Y, belonging to the logical switch fabric 54B. In this example, TOR switch 16N selects chassis switch 18M and forwards the received network traffic to chassis switch 18M for transport across physical switch fabric 14.

Figure 3:
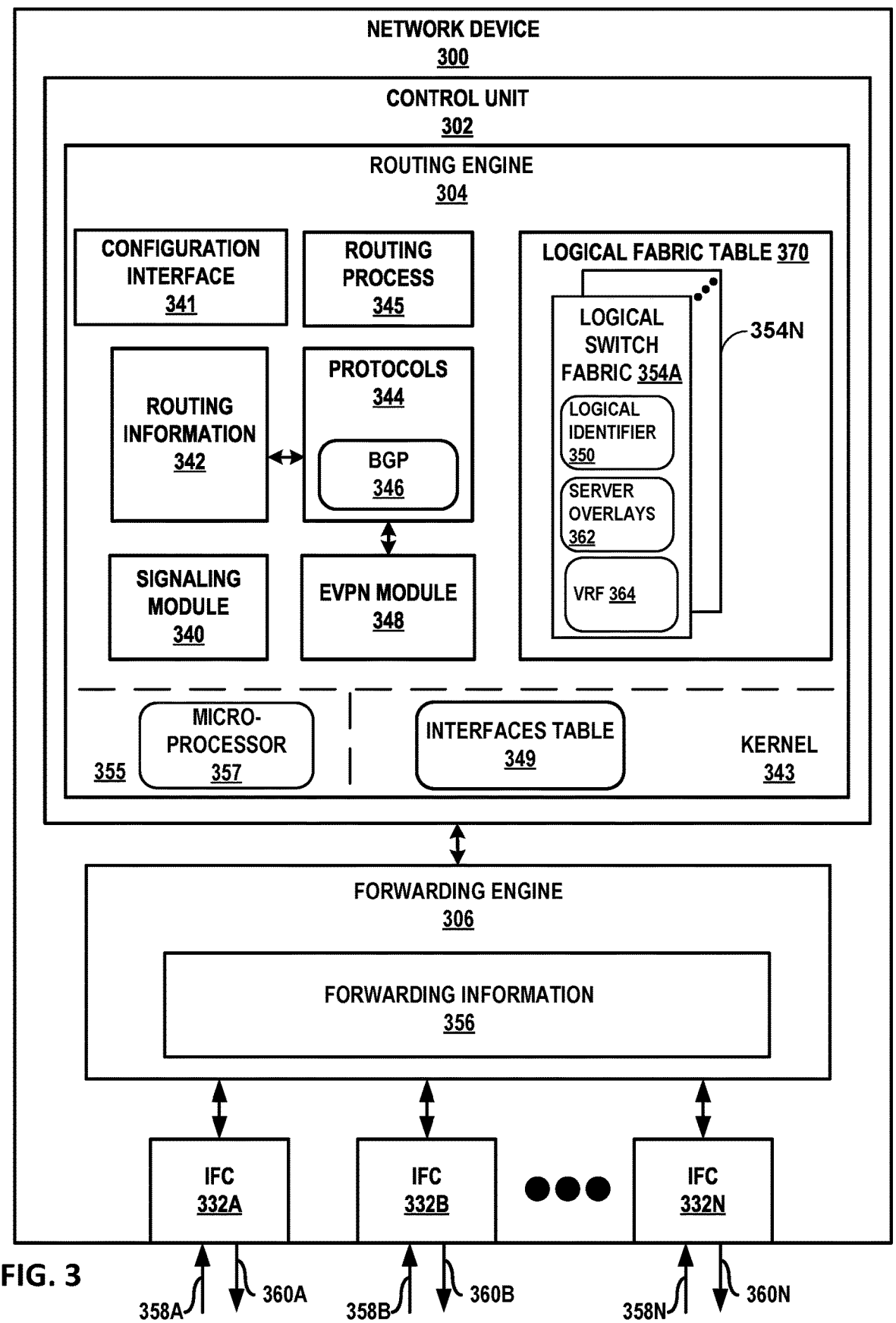
FIG. 3 is a block diagram illustrating an example of a network device in accordance with techniques described in this disclosure.

FIG. 3 is a block diagram illustrating an example network device 300 in accordance with the techniques of the disclosure. Network device 300 of FIG. 3 may be an example of one of chassis switches 18 or TOR switches 16 of FIGS. 1 and 2.

In this example, network device 300 includes a control unit 302 that includes a routing engine 304, and control unit 302 is coupled to a forwarding engine 306. Forwarding engine 306 is associated with one or more of interface cards 332A-332N ("IFCs 332") that receive packets via inbound links 358A-358N ("inbound links 358") and send packets via outbound links 360A-360N ("outbound links 360"). IFCs 332 are typically coupled to links 358, 360 via a number of interface ports (not shown). Interfaces for inbound links 358 and outbound links 360 may represent physical interfaces, logical interfaces, or some combination thereof. Interfaces for links 358, 360 may represent local interfaces of network device 300.

Elements of control unit 302 and forwarding engine 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 300, e.g., protocols. Control unit 302, in some examples, retrieves and executes the instructions from memory for these aspects.

Routing engine 304 includes kernel 343, which provides a run-time operating environment for user-level processes. Kernel 343 may represent, for example, a UNIX operating system derivative such as Linux or Berkeley Software Distribution (BSD). Kernel 343 offers libraries and drivers by which user-level processes may interact with the underlying system. Hardware environment 355 of routing engine 304 includes microprocessor 357 that executes program instructions loaded into a main memory (not shown in FIG. 2) from a storage device (also not shown in FIG. 2) in order to execute the software stack, including both kernel 343 and processes executing on the operating environment provided by kernel 343. Microprocessor 357 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 343 provides an operating environment for a routing process 345 that executes various protocols 344 at different layers of a network stack, including protocols for implementing Ethernet Virtual Private Networks. For example, routing engine 304 includes network protocols that operate at a network layer of the network stack. In the example of FIG. 2, network protocols include the Border Gateway Protocol (BGP) 346, which is a routing protocol. Routing engine 304 may also include other protocols, such as an MPLS label distribution protocol and/or other MPLS protocols not shown in FIG. 2. Routing engine 304 is responsible for the maintenance of routing information 342 to reflect the current topology of a network and other network entities to which network device 300 is connected. In particular, routing protocols periodically update routing information 342 to accurately reflect the topology of the network and other entities based on routing protocol messages received by network device 300.

Kernel 343 includes an interfaces table 349 ("interfaces 349") that represents a data structure that includes a corresponding entry for each logical interface configured for network device 300. Logical interfaces may correspond to local interfaces of network device 300 for Ethernet segments. Entries for respective logical interfaces may specify respective current information describing the logical interfaces.

Routing information 342 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing engine 304 also includes an EVPN module 348 that performs L2 learning using BGP 346. EVPN module 348 may maintain tables for each EVPN instance (EVI) established by network device 300, or in alternative examples, may maintain one or more tables that are independent of each respective EVI. In some examples, network device 300 may use EVPN module 348 to advertise, e.g., EVPN routes. Routing process 345 may use EVPN module 348 to generate EVPN routes and send and receive, via BGP 346 sessions with other network devices, the EVPN routes.

Signaling module 340 outputs control plane messages to automatically establish tunnels to interconnect multiple network devices including network device 300 and otherwise provision one or more EVIs configured for network device 300 and other network devices. Signaling module 340 may signal the network devices using one or more suitable tunnel signaling protocols, such as GRE, VXLAN, and/or MPLS protocols. Signaling module 340 can communicate with forwarding engine 306 to automatically update forwarding information 356. In some examples, signaling module 340 may be part of or executed by routing process 345.

Routing engine 304 also includes a configuration interface 341 that receives and may report configuration data for network device 300. Configuration interface 341 may represent a command line interface; a graphical user interface; Simple Network Management Protocol (SNMP), Netconf, or another configuration protocol; or some combination of the above in some examples. Configuration interface 341 receives configuration data configuring the network device 300, and other constructs that at least partially define the operations of network device 300, including the techniques described herein.

In some examples, configuration interface 341 receives configuration data that specifies one or more logical switch fabrics with which network device 300 is configured or with which network device 300 is associated. For each logical switch fabric, the configuration data may specify a logical identifier for the logical switch fabric. The configuration data may further specify, for each logical switch fabric, mapping data between the logical identifier and one or more overlay networks, mapping data between the logical identifier and one or more VRFs, such as IP-VRFs or MAC-VRFs, and/or mapping data between the logical identifier and one or more applications.

Forwarding engine 306 represents hardware and logic functions that provide high-speed forwarding of network traffic. Forwarding engine 306 typically includes a set of one or more forwarding chips programmed with forwarding information 356 that maps network destinations with specific next hops and the corresponding output interface ports. In general, when network device 300 receives a packet via one of inbound links 358, forwarding engine 306 identifies an associated next hop for the data packet by traversing the programmed forwarding information 356 based on information within the packet. Forwarding engine 306 forwards the packet on one of outbound links 360 mapped to the corresponding next hop.

In the example of FIG. 2, forwarding engine 306 includes forwarding information 356. In accordance with routing information 342, forwarding engine 306 stores forwarding information 356 that maps packet field values to network destinations with specific next hops and corresponding outbound interface ports. For example, routing engine 304 analyzes routing information 342 and generates forwarding information 356 in accordance with routing information 342. Forwarding information 356 may be maintained in the form of one or more tables, link lists, radix trees, databases, flat files, or any other data structures.

Forwarding engine 306 stores forwarding information 356 for each EVI established by network device 300 to associate network destinations with specific next hops and the corresponding interface ports. Forwarding engine 306 forwards the data packet on one of outbound links 360 to the corresponding next hop in accordance with forwarding information 356. At this time, forwarding engine 306 may push and/or pop labels from the packet to forward the packet along a correct label switched path.

In accordance with the techniques of the disclosure, network device 300 implements at least a portion of one or more logical switch fabrics 354A-354N (hereinafter, "logical switch fabrics 354"). Additionally, control unit 302 generates mapping data or associative data between a server overlay network, such as virtual networks 34 of FIG. 2, and a logical switch fabric 354 to which the server overlay network is assigned. As described in more detail below, control unit 302 may forward network traffic associated with a server overlay network to logical TOR switches of the assigned logical switch fabric 354 (provided by physical switches 16, 18 of FIG. 1) based at least in part on the mapping data or associative data between the server overlay network and the logical switch fabric 354 to which the server overlay network is assigned.

In some examples, control unit 302 stores the mapping data or associative data between a server overlay network and a logical switch fabric 354 in the form of a data structure, such as an entry in a database, a key-value pair, a look-up table, or another suitable form of data structure. In some examples, control unit 302 stores a data structure that represents each logical switch fabric 354 with a corresponding logical identifier 350, together with a mapping or association to one or more server overlay networks assigned to the logical switch fabric 354. For example, control unit 302 may define an entry for each logical switch fabric 354 within logical fabric table 370. Each entry may include a logical identifier 350, data describing one or more server overlays 362, and a Virtual Routing and Forwarding (VRF) instance 364. Logical identifier 350 may be, e.g., a color, textual descriptor, name, number, or other type of distinguishable information for the logical switch fabric 354. VRF 364 may include an Internet Protocol VRF (IP-VRF) instance or a Media Access Control VRF (MAC-VRF) instance for application to network traffic assigned to the logical switch fabric 354. In this fashion, different logical switch fabrics 354 may use different VRF instances to forward network traffic along different routes.

In some examples, control unit 302 may generate mapping data or associative data between logical identifiers and received network traffic so as to load balance different types of network traffic onto different logical switch fabrics. In some examples, control unit 302 stores such mapping data or associative data in the form of entries within logical fabric table 370. For example, as illustrated in the foregoing, control unit 302 may determine a server overlay network associated with received network traffic, and associate different logical identifiers with different sets of network traffic based on the corresponding server overlay network. In some examples, control unit 302 (or an administrator) may associate a different logical identifier to each server overlay network for which network device 300 receives network traffic. In addition or in the alternative, control unit 302 may determine an application associated with received network traffic, and associate different logical identifiers to different sets of network traffic based on the corresponding application.

In some examples, control unit 302 may generate mapping data between different logical identifiers and different sets of network traffic and/or server overlay networks based a number of additional attributes of the network traffic or of the server overlay networks. For example, control unit 302 may associate different logical identifiers with different sets of network traffic and/or server overlay networks based on, e.g., a range of Virtual Network Identifiers (VNIs) of the corresponding server overlay networks or a range of Multiprotocol Label Switching (MPLS) tags of the corresponding server overlay networks. In further examples, control unit 302 may associate different logical identifiers with different sets of network traffic and/or server overlay networks based, e.g., a number of the overlay networks sensed on a particular switch port of network device 300, a total number of the overlay networks sensed by control unit 302, a bandwidth consumed by each overlay network, a burstiness characteristic of each overlay network, or one or more applications associated with each overlay network.

Control unit 302 receives, via IFCs 332, one or more packets from servers 12 of FIG. 1. Control unit 302 determines a server overlay, such as one of virtual networks 34 of FIG. 1, with which the one or more packets are associated. Control unit 302 determines, based on the mapping data or associative data, a logical identifier 350 associated with the identified server overlay network, and selects a logical switch fabric 354 that is associated with the logical identifier 350.

Control unit 302 selects a next-hop network device associated with the selected logical switch fabric 354, and forwards the one or more packets to the next-hop network device via IFCs 332 for transport across physical switch fabric 14 of FIG. 1. In some examples, forwarding engine 306 encapsulates the forwarded packets with a header specifying the logical identifier 350 so as to signal a logical switch fabric associated with the packets to other TOR switches 16 and chassis switches 18 of physical switch fabric 14.

In some examples, network device 300 operates as one of TOR switches 16 of FIGS. 1 and 2. In some examples, network device 300 operates as a physical TOR switch that implements multiple logical TOR switches, each logical TOR switch providing a different network Operating System. In this example, network device 300 may associate one or more physical interfaces with each logical TOR switch. Additional description with respect to the use of logical TOR switches is set forth in U.S. application Ser. No. 18/491,565, entitled "Logical Top-of-Rack (TOR) Switches," filed on Oct. 20, 2023, the entire content of which is incorporated herein by reference.

Figure 4:
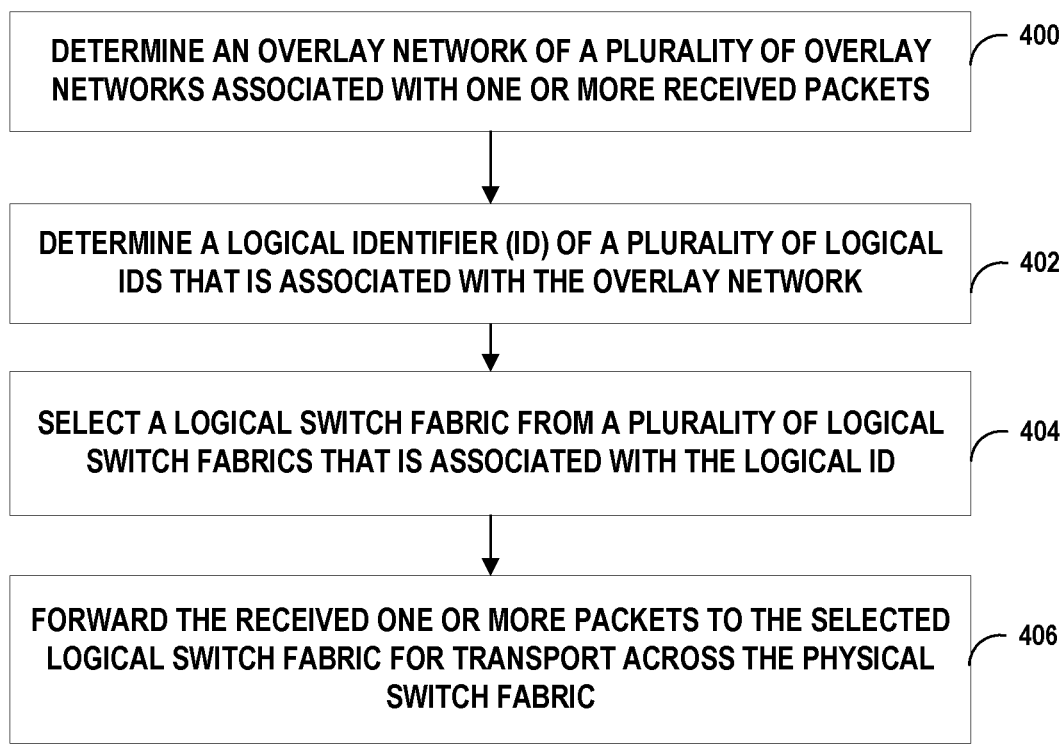
FIG. 4 is a flowchart illustrating an example operation in accordance with various aspects of the techniques described in the disclosure.

FIG. 4 is a flowchart illustrating an example operation in accordance with various aspects of the techniques described in the disclosure. FIG. 4 is described with respect to network device 300 of FIG. 3. However, in other instances, TOR devices 16 and chassis devices 18 of FIGS. 1 and 2 may perform the operation of FIG. 4.

Control unit 302 of network device 300 receives, via IFCs 332, one or more packets from servers 12 of FIG. 1. Control unit 302 determines an overlay network 34 of a plurality of overlay networks 34 associated with the one or more received packets (402). For example, control unit 302 may identify an overlay network 34 associated with the one or more received packets based at least in part on, e.g., a VNI specified by the one or more packets and assigned to a corresponding overlay network 34 or an MPLS tag specified by the one or more packets and assigned to a corresponding overlay network 34. In some examples, control unit 302 may identify an application associated with the one or more received packets based on, e.g., an AppID associated with the one or more received packets or by applying DPI to the one or more received packets.

Control unit 302 determines a logical identifier 50 that is associated with the overlay network 34 (404). For example, control unit 302 may identify the logical identifier 50 based on mapping data or associative data that maps or associates the determined overlay network 34 with the logical identifier 50. In some examples, control unit 302 may identify an entry within logical fabric table 370 that specifies the determined overlay network 34. Control unit 302 may use mapping data or associative data specified by the entry to identify the logical identifier 50 associated with the determined overlay network 34.

Control unit 302 selects a logical switch fabric 54 from a plurality of logical switch fabrics 54 that is associated with the logical identifier 50 (406). Control unit 302 forwards the received one or more packets to the selected logical switch fabric 54 for transport across the physical switch fabric 14 (408). For example, control unit 302 forwards the received one or more packets to a physical network device 16, 18 associated with the selected logical switch fabric 54 for transport across the physical switch fabric 14.

Figure 5:
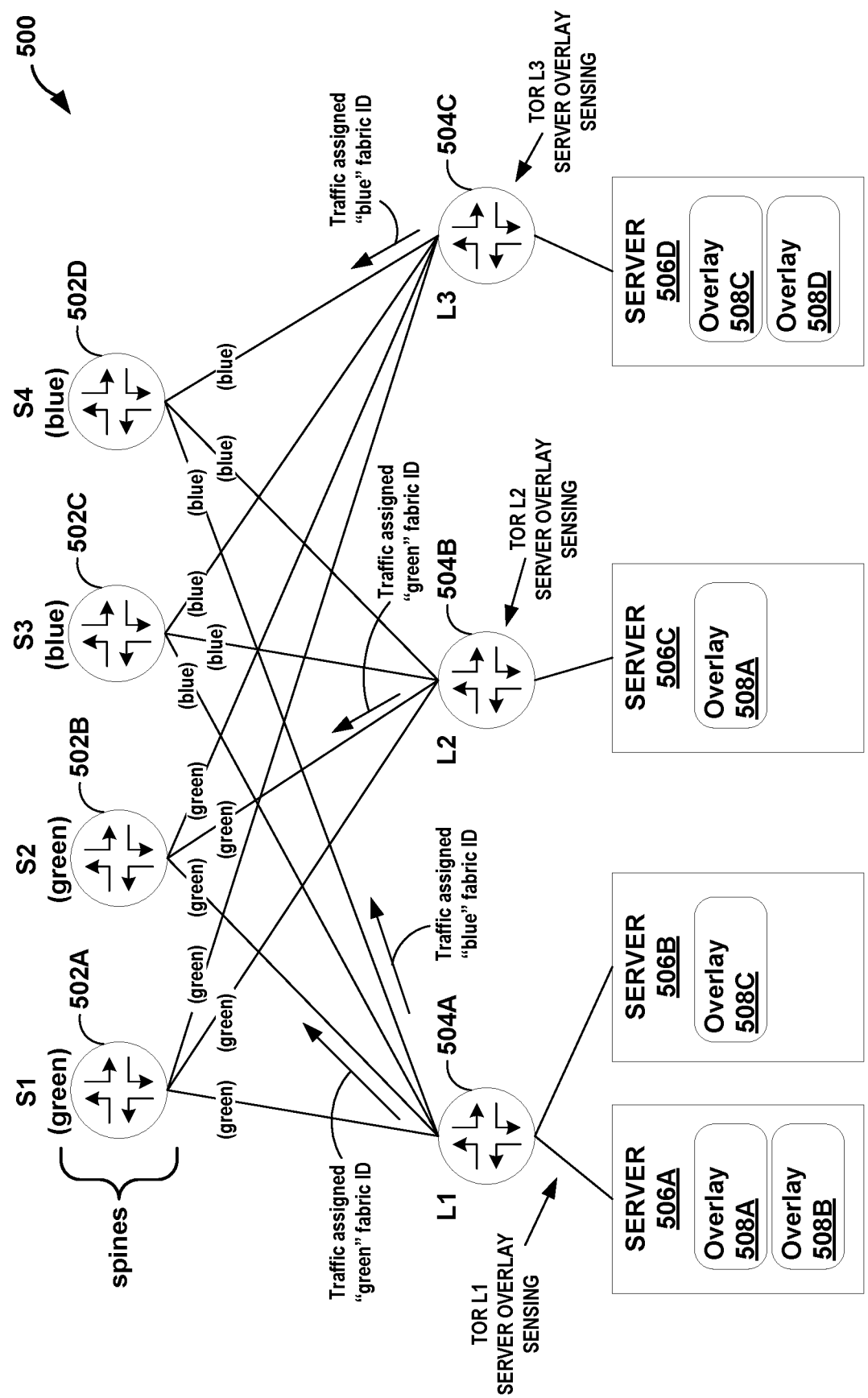
FIG. 5 is a block diagram illustrating an example network that implements logical switch fabrics overlaid upon a physical switch fabric in accordance with the techniques of the disclosure.

FIG. 5 is a block diagram illustrating an example network 500 that implements logical switch fabrics overlaid upon a physical switch fabric in accordance with the techniques of the disclosure. Network 500 of FIG. 5 includes spine network devices 502A-502D (collectively, "spines 502"), TOR switches 504A-504C (collectively, "TOR switches 504"), and servers 506A-506D (collectively, "servers 508"). Each of servers 508 communicate using one or more overlay networks 508A-508D (collectively, "overlay networks 508"). Some examples of overlay networks 508 may include VXLAN, Geneve, or SRv6 instances.

In accordance with the techniques of the disclosure, TOR switches 504 correlate the data center IP fabric underlay leaf-spine deterministic forwarding with server overlay networks 508 by sensing the server overlay 508 at the switch level (L1/L2/L3) and allocate network traffic of each respective server overlay 508 to devices to which a specific logical identifier (e.g., a fabric "color" is assigned), and forward the traffic associated with the server overlay 508 in more deterministic manner (through, e.g., spine nodes assigned the "green" or "blue" logical identifier as depicted in FIG. 5. In the example of FIG. 5, network traffic associated with overlays 508A and 508B are sent over a "blue" logical switch fabric, and network traffic associated with overlays 508C and 508D are sent over a "green" logical switch fabric.

For example, TOR switch 504A performs server overlay sensing and mapping of server overlays 508 to a logical identifier. TOR switch 504A may dynamically perform such sensing by performing server-side sensing of metadata of received network traffic. TOR switch 504A, operating as an L1 Ethernet switch, senses a server overlay 508 of network traffic received at an ingress port TOR switch 504A. TOR switch 504A allocates a server overlay 506 to a logical identifier (e.g., a fabric color), and signalizes the allocation using BGP Deterministic Path Forwarding (DPF) (which may be an example of a BGP Flex algorithm). TOR switches 504 perform sensing of the server overlay 508 so as to perform automatic grouping of server overlays 508 to different logical switch fabrics. In some examples, an administrator may allocate each server overlay 508 (or a characteristic of server overlays 508, such as application-type) to a particular logical identifier for a logical switch fabric. Such characteristics may include, e.g., pre-defined server overlay tagging wherein a range of Virtual Network Identifiers (VNIs) or range of MPLS labels are assigned to a particular logical identifier. In some examples, TOR switch 504A may move one or more server overlays 506 from one logical identifier to another logical identifier to, e.g., perform load balancing of network traffic associated with server overlays 506.

In some examples, TOR switch 504A allocates a server overlay 506 to a logical identifier based on an internal algorithm, such as a number of server overlays 506 sensed on each port of TOR switch 504A. In addition, or in the alternative, TOR switch 504A may perform sensing of the server overlays 508 and automatic allocation to a logical identifier using one or more characteristics of server overlays 508. Such characteristics may include, e.g., a number of server overlays 508 sensed on a given switch port of TOR switch 504A, a number of server overlays 508 sensed in total by TOR switch 504A, a bandwidth used by the server overlays 508, or a burstiness characteristics of a server overlay 508 (e.g., the server overlay 508 appears and disappears regularly). In some examples, TOR switch 504A may move a range of server overlays 508 to another logical switch fabric based on the analysis of the bandwidth utilization to, e.g., perform load balancing or prevent or mitigate over-utilization of a logical switch fabric.

In some examples, TOR switch 504A may allocate a server overlay 506 to a logical identifier based on application characteristics inside the server overlay. As one example, TOR switch 504A may analyze a first 256 bytes of a received packet coming from server 506A to learn if an application used inside server overlay 508A is common to a different server overlay 508 (e.g., overlay 508B) and correlate both server overlays 508A, 508B so as to allocate them under the same logical identifier. For example, if TOR switch 504A determines that both server overlays 508A, 508B are running a SQL database application, TOR switch 504A groups both server overlays 508A, 508B under the same logical identifier.

After allocating a server overlay 508 to a logical identifier for a logical switch fabric, TOR switch 504A may forward network traffic received from the server overlay 508 across a-stage or 5-stage switch fabric in a more deterministic manner. For example, TOR switch 504A allocates server overlay 508A to a "blue" logical identifier, and forwards network traffic for server overlay 508A through devices implementing a "blue" logical switch fabric. In this way, a set of overlays 508 allocated to a first logical switch fabric are fully isolated from a set of overlays 508 allocated to a second logical switch fabric. Furthermore, the network traffic of the set of overlays 508 allocated to the first logical switch fabric may not impact the performance of network traffic of the set of overlays 508 allocated to the second logical switch fabric. Using the approach described herein, an administrator may more efficiently utilize and control switch fabric resources without being impacted by the challenges related to the server overlay entropy, a problem commonly faced by conventional switch fabrics in AI/ML cluster deployments.

Figure 6A:
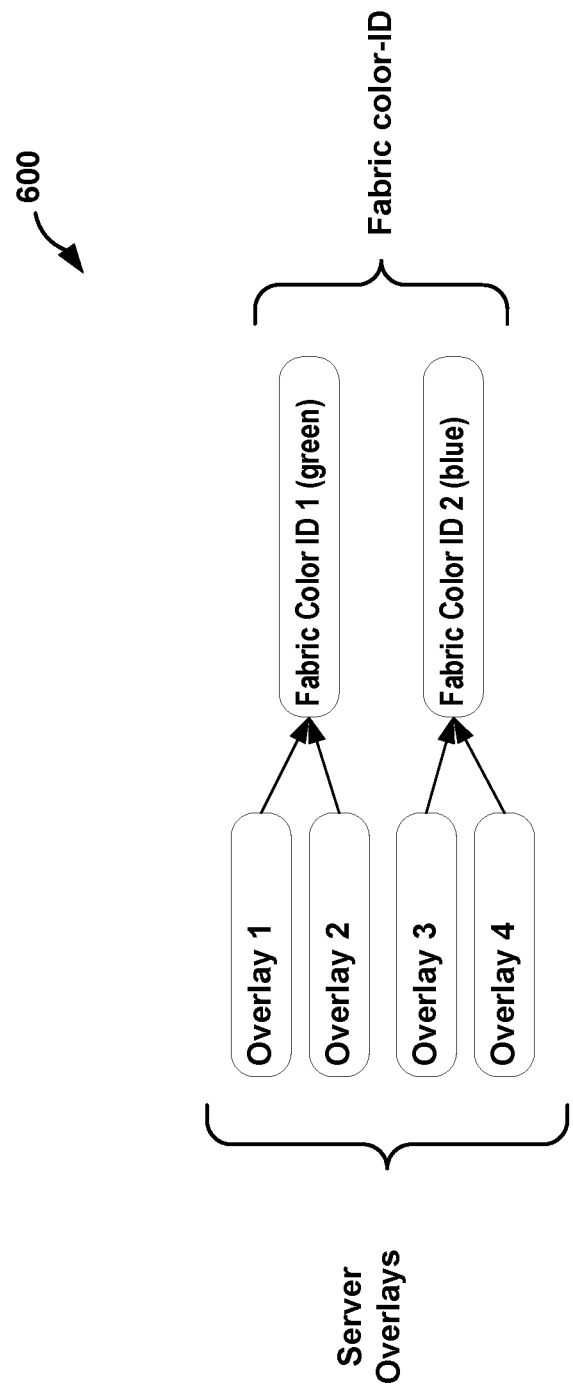
FIGS. 6A-6C are block diagrams illustrating example schema for assigning logical identifiers in accordance with the techniques of the disclosure.
Figure 6B:
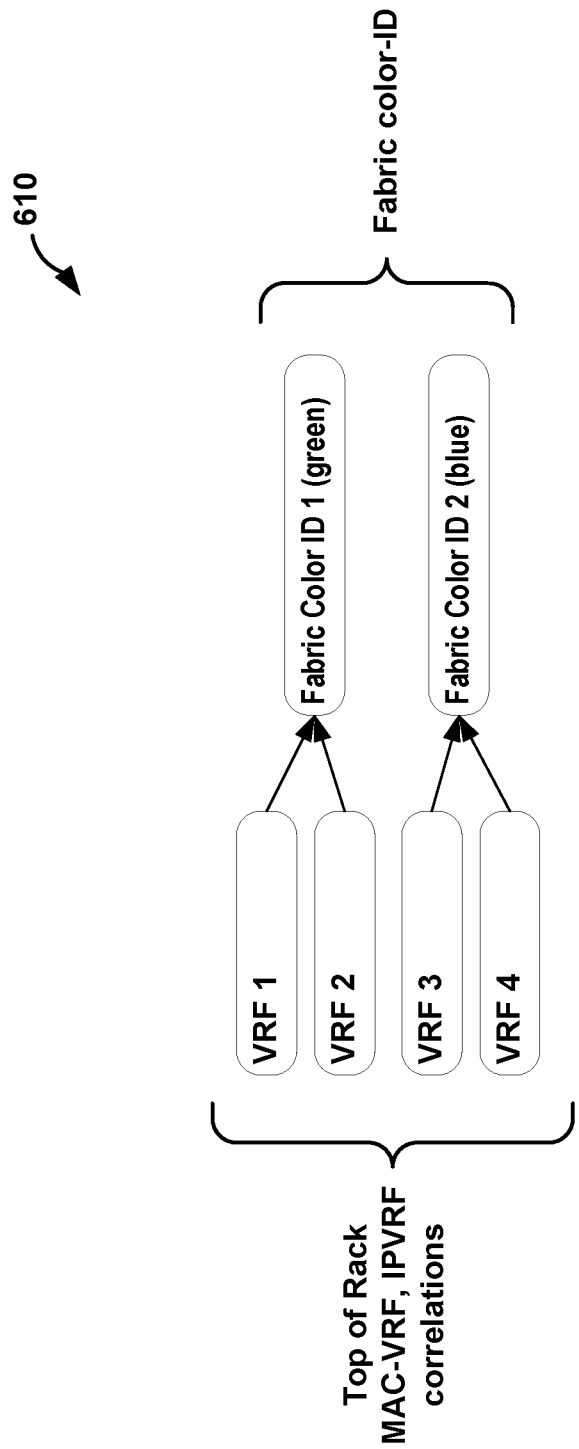
Figure 6C:
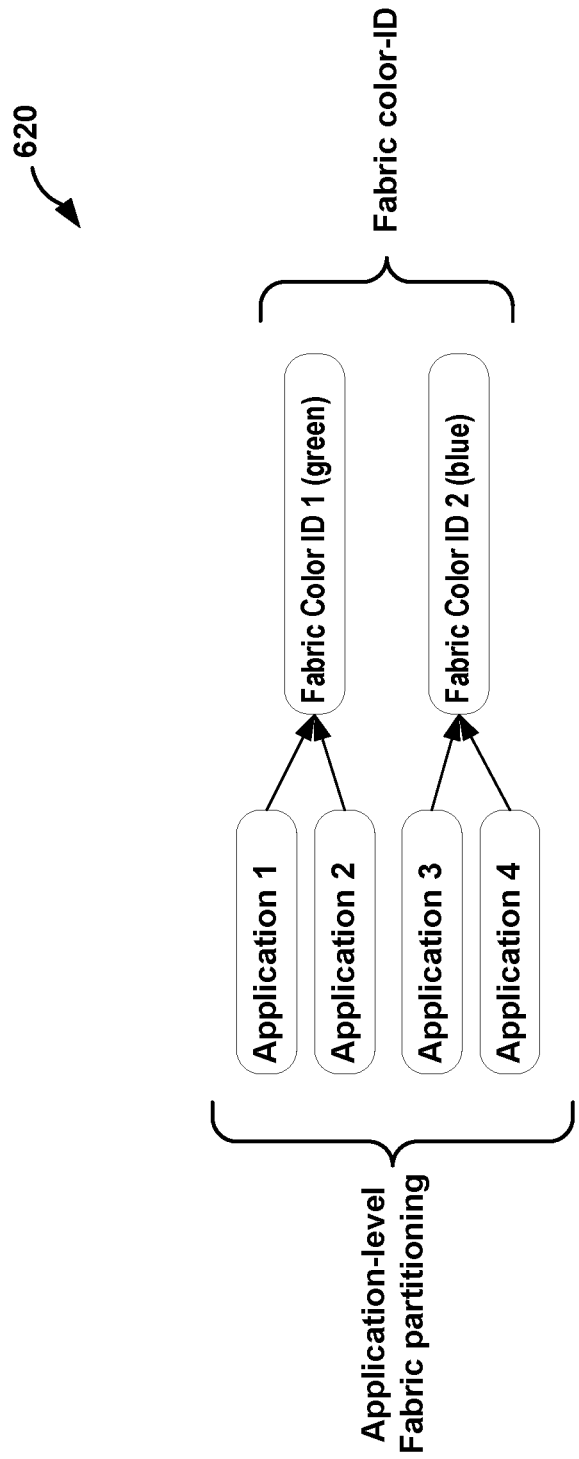

FIGS. 6A-6C are block diagrams illustrating example schema for assigning logical identifiers in accordance with the techniques of the disclosure.

FIG. 6A is a block diagram illustrating an example scheme 600 for assigning logical identifiers ("fabric color IDs 1-2" in FIG. 6A) for a logical switch fabric to server overlays ("overlays 1-4" in FIG. 6A) to correlate server overlays to logical switch fabrics, in accordance with the techniques of the disclosure.

In accordance with the techniques of the disclosure, a network device, such as TOR switches 16 or chassis switches 18 of FIG. 1, correlates data center IP fabric underlay leaf-spine deterministic forwarding with server overlay networks by sensing a server overlay at the switch level, allocating the sensed server overlay network to specific fabric colors, and forwarding network traffic for the server overlay in a more deterministic manner.

In some examples, an administrator may manually allocate a server overlay network to a logical identifier using specific overlay information. For example, a server overlay network may be assigned a logical identifier based on a VXLAN VNI or a VXLAN Group-based Policy (GBP) of the server overlay network. Using the techniques described herein, a data center administrator may more efficiently utilize and control the resources of a physical switch fabric without incurring the challenges related to server overlay entropy.

In the example of FIG. 6A, the physical switch fabric uses two logical identifiers, "green" and "blue," to define two logical switch fabrics. In other examples, other numbers of logical identifiers may be used. For example, a physical switch fabric may use 16 different colors to define 16 logical switch fabrics, or 128 different colors to define 128 logical switch fabrics, etc. In other examples, the physical switch fabric may use other types of identifiers, such as numbers, textual descriptors, names, etc.

In some examples, TOR switches 16 or chassis switches 18 may forward network traffic for a server overlay network across the physical switch fabric (e.g. the data plane) using an Internet Protocol-in-Internet-Protocol version 6 (IPinIPV6) (Segment Routing Header (SRH)-less) switch fabric or using a Segment Routing version 6 (SRv6) stack of micro-Segment Identifiers (uSIDs or uSIDs) (e.g., 3-stage or 5-stage), depending on the diameter of the data center switch fabric (typically with 5 nodes in the SRv6 path). When the switch fabric uses IPinIPV6 for forwarding purposes (which may be signalized by BGP Flex Algorithm or BGP DPF, for example) then TOR switches 16 or chassis switches 18 may embed information specifying the logical identifier for the logical switch fabric in the IPV6 header. A last-hop network device sends network traffic to a corresponding egress port based on the allocation of a service to a logical identifier. When native SRv6 with uSID information is used, the network device uses the logical identifier and the corresponding service VRF information to forward the network traffic to the corresponding egress port, after the decapsulation process.

FIG. 6B is a block diagram illustrating an example scheme 610 for assigning logical identifiers ("fabric color IDs 1-2" in FIG. 6B) for a logical switch fabric to TOR MAC-VRF and IP-VRF instances ("VRFs 1-4" in FIG. 6B) to correlate VRFs to logical switch fabrics, in accordance with the techniques of the disclosure.

In accordance with the techniques of the disclosure, a network device, such as TOR switches 16 or chassis switches 18 of FIG. 1, correlates the data center IP Fabric underlay leaf-spine deterministic forwarding with server overlay networks by manually allocating local ToR IP-VRF or MAC-VRF resources to a specific logical identifier for a logical switch fabric. As depicted in the example of FIG. 6B, MAC-VRF 1 and MAC-VRF 2 are allocated to the "green" logical identifier, while IP-VRF 3 and IP-VRF 4 are allocated to the "blue" logical identifier. In some examples, the assignment of a particular VRF instance to a logical identifier (and corresponding logical switch fabric) may be performed manually, statically configured by an administrator, or dynamically when network traffic is received.

In the example of FIG. 6B, the physical switch fabric uses two logical identifiers, "green" and "blue," to define two logical switch fabrics. In other examples, other numbers of logical identifiers may be used. For example, a physical switch fabric may use 16 different colors to define 16 logical switch fabrics, or 128 different colors to define 128 logical switch fabrics, etc. In other examples, the physical switch fabric may use other types of identifiers, such as numbers, textual descriptors, names, etc. Having support for numerous logical identifiers (e.g., numerous logical switch fabric colors) may be useful when one physical node maintains multiple logical switch fabrics.

In some examples, TOR switches 16 or chassis switches 18 may forward network traffic for a server overlay network across the physical switch fabric (e.g. the data plane) using an IPinIPV6 (SRH-less) switch fabric or using an SRv6 stack of uSIDs (e.g., 3-stage or 5-stage), depending on the diameter of the data center switch fabric (typically with 5 nodes in the SRv6 path). When the switch fabric uses IPinIPv6 for forwarding purposes (which may be signalized by BGP Flex Algorithm or BGP DPF, for example) then TOR switches 16 or chassis switches 18 may embed information specifying the logical identifier for the logical switch fabric in the IPV6 header.

FIG. 6C is a block diagram illustrating an example scheme 620 for assigning logical identifiers ("fabric color IDs 1-2" in FIG. 6C) for a logical switch fabric to applications ("applications 1-4" in FIG. 6C) to perform application-level fabric partitioning, in accordance with the techniques of the disclosure.

In accordance with the techniques of the disclosure, a network device, such as TOR switches 16 or chassis switches 18 of FIG. 1, correlates the data center IP Fabric underlay leaf-spine deterministic forwarding with server overlay networks and automatically or manually allocates different applications to different logical identifiers (and thereby, to different logical switch fabrics). For example, the network device may detect or understand an application associated with network traffic of a server overlay network, and assign the application to a logical identifier such that network traffic associated with that application is forwarded over a logical switch fabric corresponding to the logical identifier. In some examples, the network device may identify an application using either TCP or User Datagram Protocol (UDP) source and destination address information, IP source and destination address information, or custom header identification. In some examples, the network device may advertise a logical identifier allocated to the application using BGP Flex Algorithm or BGP DPF.

As depicted in the example of FIG. 6C, Application 1 and Application 2 are allocated to the "green" logical identifier, while Application 3 and Application 4 are allocated to the "blue" logical identifier. In some examples, the network device may apply a firewall filter, such as an Access Control List (ACL), per-interface, to allocate network traffic of an application to a particular logical identifier. In other examples, the network device may use a global allocation of applications to a particular logical identifier.

In the example of FIG. 6C, the physical switch fabric uses two logical identifiers, "green" and "blue," to define two logical switch fabrics. In other examples, other numbers of logical identifiers may be used. For example, a physical switch fabric may use 16 different colors to define 16 logical switch fabrics, or 128 different colors to define 128 logical switch fabrics, etc. In other examples, the physical switch fabric may use other types of identifiers, such as numbers, textual descriptors, names, etc.

In some examples, TOR switches 16 or chassis switches 18 may forward network traffic for a server overlay network across the physical switch fabric (e.g. the data plane) using an IPinIPV6 (SRH-less) switch fabric or using an SRv6 stack of uSIDs (e.g., 3-stage or 5-stage), depending on the diameter of the data center switch fabric (typically with 5 nodes in the SRv6 path). When the switch fabric uses IPinIPv6 for forwarding purposes (which may be signalized by BGP Flex Algorithm or BGP DPF, for example) then TOR switches 16 or chassis switches 18 may embed information specifying the logical identifier for the logical switch fabric in the IPV6 header.

In some examples, a network device, such as TOR switches 16 or chassis switches 18 of FIG. 1, may perform control plane BGP-DPF so as to perform deterministic path forwarding and mapping of network traffic associated with a server overlay to a particular logical identifier (and corresponding logical switch fabric). In some examples, the mapping proposals described herein can be achieved inside a 3-stage or 5-stage architecture using the control plane level mechanism, wherein a new BGP AFI/SAFI signalization with a range of services (e.g., IP-VRFs, MAC-VRFs) is mapped to a specific logical identifier. In this way, the data center fabric administrator may define performance requirements for a given logical switch fabric, such as a required bandwidth, latency, packet loss, and thereafter allocate a range of services (e.g., IP-VRFs or MAC-VRFs) to a logical identifier corresponding to the logical switch fabric.

A network device may use the new AFI/SAFI described herein to advertise a logical switch fabric to multiple VRF associations on a same BGP peering session. Using the techniques described herein, an administrator may use a new logical capacity planning hierarchical approach, instead of the conventional VRF-per-VRF level approach.

As described herein, a fabric administrator may use a top hierarchical view of the physical switch fabric to allocate different services (VRFs). The following is an illustrative fabric hierarchy of a logical identifier-to-services mapping for a logical switch fabric in accordance with the techniques of the disclosure.

Step1: Logical Fabric-Id Definition.
set forwarding-option fabric-id 1
   bandwidth required 200G
   load balancing type: static
   fallback fabric-id 2
set forwarding-option fabric-id 2
   bandwidth required 200G
   lossless fabric
   load balancing type: dynamic
   fallback fabric-id 1
set forwarding-option fabric-id 3
   bandwidth required 400G
   fallback fabric-id 2
Step2: Service Allocation Step.
set forwarding-option fabric-id 1
   services: ipvrf1, ipvrf2,
set forwarding-option fabric-id 2
   services: ipvrf3, ipvrf4, mac-vrf1
set forwarding-option fabric-id 3
   services: ipvrf1, ipvrf2,
Transport Options when Using Logical Identifier.

As described herein, the use of BGP-DPF may offer two main transport options at the data plane level: SRv6 with uSID, or SRH-less encapsulation via IPinIPv6. A modern switching infrastructure that supports the uSID SRv6 transport may scale better and perform better than an option using tunnels, such as using SRH-less encapsulation.

The enforcement point for the performance requirements (latency, bandwidth, lossless fabric) of a given logical identifier occurs at the SRv6 LSP-level, or using the DiffServ model when using the IPinIPV6 SRH-less tunnel. The transport options used here may only be relevant when there is VRF-level segmentation enabled at the leaf-node level.

Figure 7:
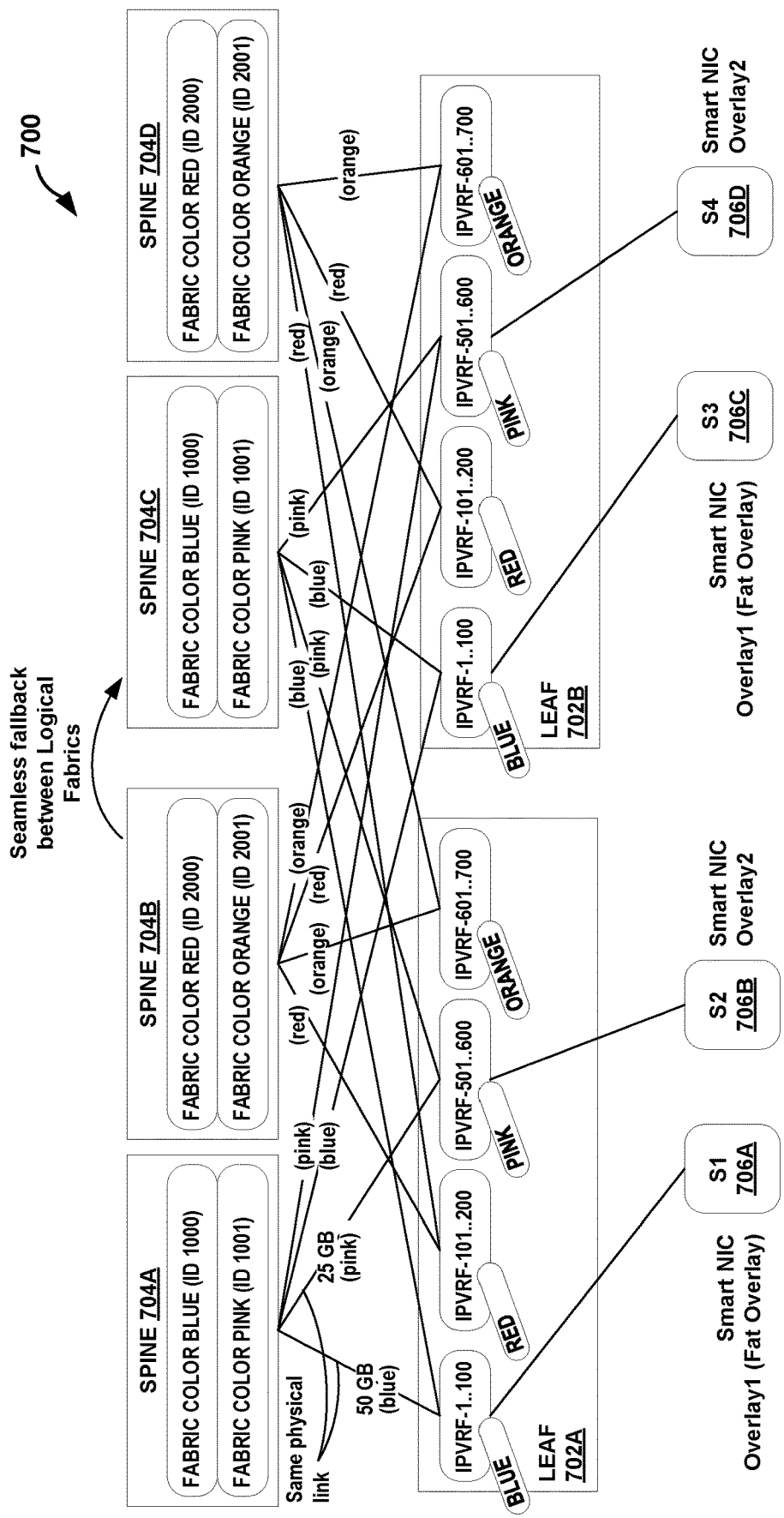
FIG. 7 is a block diagram illustrating an example network system that implements a fallback mechanism in accordance with the techniques of the disclosure.

FIG. 7 is a block diagram illustrating an example network system 700 that implements a fallback mechanism in accordance with the techniques of the disclosure. Network system 700 includes spine devices 704A-704D (collectively, "spines 704") and leaf devices 702A-702B (collectively, "leaves 702"), which provide a physical switch fabric to server devices hosting server overlay networks 706A-706D (collectively "server overlay networks 706"). Network system 700, as illustrated in FIG. 7, provides a fallback mechanism for seamless redundancy. As depicted in the example of FIG. 7, services are allocated to different logical identifiers, and a given logical switch fabric corresponding to a logical identifier is provisioned for automatic fallback or failover to another logical switch fabric.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A network device comprising:
storage media; and
processing circuitry in communication with the storage media, the processing circuitry configured to:
   determine an overlay network of a plurality of overlay networks associated with a received packet;
   determine a logical identifier (ID) of a plurality of logical IDs that is associated with the overlay network;
   select a logical switch fabric from a plurality of logical switch fabrics that is associated with the logical ID, the plurality of logical switch fabrics overlaid upon a physical switch fabric comprising a plurality of network switch devices; and
   forward the received packet to the selected logical switch fabric for transport across the physical switch fabric.

2. The network device of claim 1, wherein the logical identifier corresponds to a color.

3. The network device of claim 1, wherein the processing circuitry is further configured to:
associate network traffic of the plurality of overlay networks associated with different applications to respective logical IDs of the plurality of logical IDs.

4. The network device of claim 1, wherein the processing circuitry is further configured to:
associate different subsets of the plurality of overlay networks to respective logical IDs of the plurality of logical IDs.

5. The network device of claim 4, wherein the processing circuitry is configured to associate the different subsets of the plurality of overlay networks to the respective logical IDs of the plurality of logical IDs based on one or more of:
Virtual Network Identifiers (VNIs) of the plurality of overlay networks; or
Multiprotocol Label Switching (MPLS) tags of the plurality of overlay networks.

6. The network device of claim 4, wherein the processing circuitry is configured to assign the subsets of the plurality of overlay networks to different logical IDs of the plurality of logical IDs based on one or more of:
- a number of the plurality of overlay networks sensed on a switch port of the network device;
- a total number of the plurality of overlay networks sensed by the network device;
- a bandwidth consumed by each overlay network of the plurality of overlay networks;
- a burstiness characteristic of each overlay network of the plurality of overlay networks; or
- one or more applications associated with each overlay network of the plurality of overlay networks.

7. The network device of claim 1, wherein the processing circuitry is configured to encapsulate the received packet with a header specifying the logical ID and forward the received packet with the header to the selected logical switch fabric.

8. The network device of claim 1, wherein each logical switch fabric of the plurality of logical switch fabrics is assigned at least one of a different Internet Protocol Virtual Routing Forwarding (IP-VRF) instance or a different Media Access Control Virtual Routing and Forwarding (MAC-VRF) instance.

9. The network device of claim 1, wherein each logical switch fabric of the plurality of logical switch fabrics is assigned a different application of a plurality of applications.

10. The network device of claim 1, wherein a network switch device of the plurality of network switch devices of the physical switch fabric implements at least a portion of a first logical switch fabric and at least a portion of a second logical switch fabric of the plurality of logical switch fabrics.

11. The network device of claim 1,
wherein a first network switch device of the plurality of network switch devices of the physical switch fabric implements at least a portion of a first logical switch fabric of the plurality of logical switch fabrics, and
wherein a second network switch device of the plurality of network switch devices of the physical switch fabric implements at least a portion of a second logical switch fabric of the plurality of logical switch fabrics.

12. A method comprising:
- determining, by a network device, an overlay network of a plurality of overlay networks associated with a received packet;
- determining, by the network device, a logical identifier (ID) of a plurality of logical IDs that is associated with the overlay network;
- selecting, by the network device, a logical switch fabric from a plurality of logical switch fabrics that is associated with the logical ID, the plurality of logical switch fabrics overlaid upon a physical switch fabric comprising a plurality of network switch devices; and
- forwarding, by the network device, the received packet to the selected logical switch fabric for transport across the physical switch fabric.

13. The method of claim 12, further comprising associating, by the network device, network traffic of the plurality of overlay networks associated with different applications to respective logical IDs of the plurality of logical IDs.

14. The method of claim 12, further comprising associating, by the network device, different subsets of the plurality of overlay networks to respective logical IDs of the plurality of logical IDs.

15. The method of claim 14, wherein associating the different subsets of the plurality of overlay networks to the respective logical IDs of the plurality of logical IDs comprises assigning the different subsets of the plurality of overlay networks to the logical IDs of the plurality of logical IDs based on one or more of:
- Virtual Network Identifiers (VNIs) of the plurality of overlay networks; or
- Multiprotocol Label Switching (MPLS) tags of the plurality of overlay networks.

16. The method of claim 14, wherein assigning the different subsets of the plurality of overlay networks to the logical IDs of the plurality of logical IDs comprises assigning the different subsets of the plurality of overlay networks to the logical IDs of the plurality of logical IDs based on one or more of:
- a number of the plurality of overlay networks sensed on a switch port of the network device;
- a total number of the plurality of overlay networks sensed by the network device;
- a bandwidth consumed by each overlay network of the plurality of overlay networks;
- a burstiness characteristic of each overlay network of the plurality of overlay networks; or
- one or more applications associated with each overlay network of the plurality of overlay networks.

17. The method of claim 12, further comprising encapsulating the received packet with a header specifying the logical ID and forwarding the received packet with the header to the selected logical switch fabric.

18. The method of claim 12, wherein each logical switch fabric of the plurality of logical switch fabrics is assigned at least one of a different Internet Protocol Virtual Routing Forwarding (IP-VRF) instance or a different Media Access Control Virtual Routing and Forwarding (MAC-VRF) instance.

19. The method of claim 12, wherein a network switch device of the plurality of network switch devices of the physical switch fabric implements at least a portion of a first logical switch fabric and at least a portion of a second logical switch fabric of the plurality of logical switch fabrics.

20. Non-transitory, computer-readable media comprising instructions that, when executed, are configured to cause processing circuitry of a network device to:
- determine an overlay network of a plurality of overlay networks associated with a received packet;
- determine a logical identifier (ID) of a plurality of logical IDs that is associated with the overlay network;
- select a logical switch fabric from a plurality of logical switch fabrics that is associated with the logical ID, the plurality of logical switch fabrics overlaid upon a physical switch fabric comprising a plurality of network switch devices; and
- forward the received packet to the selected logical switch fabric for transport across the physical switch fabric.

* * * * *